2,818,429

NAPHTHENOHYDROXAMIC ACID MANUFACTURING PROCESS

Helen Sellei Beretvas, Chicago, Ill., assignor to Standard Oil Company, Chicago, Ill., a corporation of Indiana No Drawing. Application July 20, 1956
Serial No. 599,026

4 Claims. (Cl. 260—500)

This invention relates to an improved naphthenohydroxamic acid manufacturing process and it pertains more particularly to the preparation of an improved naphthenohydroxamic acid of higher nitrogen content and/or in higher yields than has heretofore been commercially produced and to an improved technique for making said naphthenohydroxamic acid.

U. S. 2,397,508 describes the manufacture of naphthenohydroxamic acid and points out that it is useful as a rust inhibitor for turbine oils, transformer oils and the like. Heretofore the commercial manufacture of such hydroxamic acid has required prolonged reaction time thereby limiting the amount of product obtainable in given equipment; an object of this invention is to provide an improved technique which will enable the reaction time to be enormously decreased with consequent increase in the throughput of such plant. While high yields of "crude" naphthenohydroxamic acids were obtainable in the prior process, the crude product contained substantially less than 3 percent nitrogen and there are indications that this crude product actually contains some naphthenic acid which indicates that a saponification reaction has been competing with the desired conversion to hydroxamic acid; an object of this invention is to provide a process which will minimize any such side reactions and which will produce a naphthenohydroxamic acid containing 3.0 to 3.8 percent nitrogen in its undiluted state. A further object is to provide higher yields of a uniformly higher quality naphthenohydroxamic acid from a given amount of reactants and to eliminate operating difficulties that have heretofore been encountered. Other objects will be apparent as the detailed description of the invention proceeds.

I have discovered that the quality of naphthenohydroxamic acid can be remarkably enhanced by employing a sequence of steps and conditions which will minimize competing reactions. The addition of reactants should be at relatively high temperatures in the range of about 70 to 130° F. (preferably 80–110° F.) and should be quite rapid, i. e. less than two hours in each case (preferably 30 to 90 minutes) but the reaction which is mainly effected after addition of NaOH should be at about 40 to 70° F. (preferably 50–60° F.) for a period of about 1 to 20 hours, preferably about 4 to 12 hours. The amount of water which is present in the system after all sodium hydroxide has been added thereto should be on a weight basis not more than the amount of sodium hydroxide which is employed, but preferably less—this feature has been found to be very important. It is also important that the hydroxylamine salt be added in alcoholic solution rather than as a solid or slurry.

Specifically, I first dissolve the hydroxylamine hydrochloride in about 4 to 10 volumes of methyl alcohol (although ethyl alcohol or isopropyl alcohol may be used) at substantially reflux temperature, i. e. at about 150° F. I then cool the solution to at least about 70° F. and I have found that even though some of the hydroxylamine hydrochloride may come out of solution, this is of no consequence if the methyl ester of naphthnic acid is immediately added with rapid stirring while maintaining the temperature in the range of 70 to 130° F. and effecting the addition in a period of about 3 to 30 minutes, the shorter times being desirable at higher temperatures in the respective ranges. I then immediately add about 2 moles of NaOH per mole $H_2N.OH.HCl$ with rapid stirring during a period of about .1 to 1.5 hours, preferably about .5–1.0 hour while maintaining the reaction mixture at a temperature in the range of 70 to 130° F., preferably 80° to 100° F. At least about 10 percent of the NaOH is preferably added in dry solid form and the remaining NaOH may be added as a concentrated aqueous solution, it being important that the total amount of water present in the reaction mixture after the addition of NaOH be not more on a weight basis than the amount of added NaOH but preferably less. Instead of adding solid NaOH, I may add all of it in an aqueous solution which is sufficiently hot so that the caustic is substantially in excess of the total amount of water present in the mixture. After the NaOH is added with stirring at 80 to 130° F., the reaction mixture is cooled to about 40 to 70° F., preferably about 50° F. to 60° F., and the reaction is allowed to proceed for about 1 to 20 hours, preferably about 4 to 12 hours. after which said mixture is acidified with an appropriate acid, like sulfuric acid, until it is acid to methyl orange. The mixture is then allowed to stratify, the upper naphthenohydroxamic acid layer is separated and either washed with an aqueous salt solution or diluted with an equal weight of light oil and washed with water until neutral to congo test paper. After the washing step the product is dried in any known manner, preferably by adding anhydrous sodium sulfate thereto followed by filtration.

The final product obtained from naphthenic acid with about 250 molecular weight is a naphthenohydroxamic acid which contains about 3.0 to 3.8 percent nitrogen, is a product of higher purity than heretofore produced and it is therefore more effective as a rust inhibitor for turbine oils and the like. As a specific example of the invention, 28 grams of $H_2N.OH.HCl$ is dissolved under reflux conditions in 112 cc. of a substantially anhydrous methyl alcohol. The solution is cooled to about 60–90° F. and 100 grams of methyl naphthenate (250–280 combining weight calculated from the saponification number of the ester used) is added thereto with rapid stirring in a period of about 15 minutes while holding the temperature at about 100° F. Next a hot solution containing 35 grams of NaOH and 30 grams of water is added with rapid stirring in a period of about ½ hour while holding the temperature of the mixture in the range of about 80 to 100° F. The reaction mixture is then immediately cooled to about 50 to 60° F. and held at this temperature for a period of about 4 hours after which reaction period the mixture is acidified with sulfuric acid until acid to methyl orange. The acidified mixture is allowed to stratify and the upper naphthenohydroxamic acid layer is removed from the lower layer, washed with an aqueous salt solution, dried by adding anhydrous sodium sulfate and filtered. The resulting product is found to have a nitrogen content of 3.5 percent by weight. When the reaction is carried out with substantially the same amounts of the same reactants but with 100 cc. of a 50 percent ethyl alcohol-water solution of the 28 grams $H_2N.OH.HCl$ and 66 grams of a 50 percent NaOH solution by weight in water (giving 83 parts by weight of water to 33 parts by weight of NaOH) the product contains only 2.3 percent nitrogen by weight.

In another example wherein all of the caustic is introduced in the form of pellets and no water is present but wherein the steps and conditions are otherwise the same as in the foregoing example, a product containing 3.6 weight percent nitrogen is obtained. However, in commercial operations it is difficult to maintain the reaction mixture at constant temperature if all of the caustic is added in solid form as pellets and the preferred technique is to add about 70 to 90, e. g. 80, percent of the caustic in the form of a saturated or approximately 50 percent solution and then adding the remaining 10 to 30, e. g. 20, percent of the NaOH in solid form.

It will be noted in the above examples that hydroxlyamine hydrochloride was employed in alcoholic solution rather than in solid or slurry form; this has been found to be essential for obtaining most advantageous results. The amounts of reagents will, of course, depend on the combining weight of the naphthenic acid ester which can be calculated from the saponification number of the ester used; each mole of ester requires 1 mole of hydroxylamine hydrochloride and 2 moles of sodium hydroxide. A series of tests were made using a naphthenic acid having an average combining weight of about 250 employing my improved technique with results shown in the following table.

| Test | A | B | C | D | E | F | G |
|---|---|---|---|---|---|---|---|
| Parts by weight of: | | | | | | | |
| Naphthenic acid ester | 100 | 100 | 100 | 100 | 100 | 100 | 100 |
| $H_2N.OH.HCl$ | 35.5 | 35.5 | 28 | 28 | 28 | 28 | 28 |
| Methyl alcohol | | | 90 | 90 | 90 | 110 | 90 |
| Ethyl alcohol | 40 | 72 | | | | | |
| Water | 83 | 33 | 30 | 0 | 10 | 30 | 30 |
| NaOH | 33 | 33 | 35 | 35 | 35 | 35 | 35 |
| Hours reacted | 4 | 4 | 4 | 4 | 4 | 12 | 1.5 |
| Percent $N_2$ | 2.3 | 3.2 | 3.5 | 3.6 | 3.5 | 3.2 | 3.0 |
| Comments | Excess water. | | 3.8% $N_2$ at 22 hours. | | | | |

The low nitrogen content of the product produced in Test A was the result of the excessive amount of water, this test having been included for the purpose of comparison and not as an example of the invention. Other tests have shown that even in the absence of excessive water, the desired results are not obtained unless the defined procedural steps and conditions are adhered to, including the step of initially dissolving $H_2N.OH.HCl$ in alcohol.

As an example of large scale operation, 870 pounds of methanol were refluxed with 274 pounds of $H_2N.OH.HCl$ for about 1 hour, then cooled to 90° F. and 980 pounds of methyl naphthenate of 195–220 saponification number were added within 30 minutes at 90–105° F. The mixture was then cooled to about 60° F. and 565 pounds of 48 percent caustic solution was added with stirring in about 70 minutes, during which time the temperature arose to a maximum of about 110° F. and was maintained at an average of 80 to 100° F. Then, 73 pounds of solid NaOH was added within 20 minutes with vigorous stirring while the temperature was held in the range of 88 to 94° F. A sample was drawn 30 minutes after the NaOH addition, acidified and washed free of acid and salt; it had a nitrogen content of 3.0 percent. The rest of the batch was stirred for a total of 12 hours at about 50 to 60° F., then treated with sulfuric acid, blended with 50 percent white oil, washed and dried; the resulting 50 percent product had a nitrogen content of 1.6 to 1.7 (corresponding to a product nitrogen content of 3.2–3.4) and it had excellent rust preventative qualities.

While other esters than the methyl ester of naphthenic acid may be employed as pointed out in the prior patent (2,397,508), I have found that the methyl ester gives best results. The methyl ester may be made from various types of naphthenic acids, these being adequately defined in the prior patent. Since the reaction per se, equivalents of various reactants, and product recovery steps are clearly described in the prior patent, it is unnecessary to discuss them herein.

I claim:

1. In the process of making naphthenohydroxamic acid by reaction of a naphthenic acid ester with a hydroxylamine hydrochloride and sodium hydroxide in an alcoholic solution followed by acidification with sulfuric acid and product purification, the improved method of operation which comprises adding the ester and then the sodium hydroxide to an alcoholic solution of hydroxylamine hydrochloride at temperatures in the range of about 70 to 130° F. with rapid stirring, cooling the reaction mixture, after the addition of sodium hydroxide, to a temperature in the range of 40 to 70° F. and holding the reaction mixture in said temperature range for a period of about 1 to 20 hours, and introducing into said total reaction mixture a total amount of water which is not substantially more on a weight basis than the amount of sodium hydroxide introduced thereto.

2. The method of claim 1 which includes the step of introducing at least a part of the sodium hydroxide in solid form.

3. The method of making naphthenohydroxamic acid which comprises dissolving hydroxylamine hydrochloride in about 4 to 10 volumes of an alcohol having less than 4 carbon atoms per molecule at substantially reflux temperature, cooling the resulting solution to a temperature not higher than about 70° F. and adding about 1 mole of methyl naphthenic acid ester per mole of hydroxylamine hydrochloride to said cooled solution with stirring in a period of about 3 to 30 minutes while holding the temperature of the solution in the range of about 70 to 130° F., then adding about 2 moles by weight of sodium hydroxide per mole of $H_2N.OH.HCl$ in about .1 to 1.5 hours while maintaining the mixture at temperatures in the range of about 70 to 130° F., the amount of water introduced with the sodium hydroxide being sufficiently small so that the total amount of water in the reaction mixture is not more on a weight basis than the amount of sodium hydroxide therein, cooling the reaction mixture after the sodium hydroxide is added to a temperature in the range of 40 to 70° F. and holding the temperature of the reaction mixture in said range for a period of about 1 to 20 hours, then acidifying the mixture with sulfuric acid until it shows an acid reaction to methyl orange, and recovering a substantially pure naphthenohydroxamic acid from the acidified reaction mixture.

4. The method of claim 3 which includes the step of adding about 70 to 90 percent of the sodium hydroxide in the form of a substantially saturated aqueous solution and thereafter adding the remainder of the sodium hydroxide in substantially dry form.

References Cited in the file of this patent

UNITED STATES PATENTS

| 2,168,305 | Lippincott | Aug. 1, 1939 |
| 2,397,508 | Rouault et al. | Apr. 2, 1946 |